(12) United States Patent
Haegerstam

(10) Patent No.: US 10,655,527 B2
(45) Date of Patent: May 19, 2020

(54) ARRANGEMENT AND A METHOD FOR CONTROLLING THE TEMPERATURE OF AIR BEING FED TO A VEHICLE ENGINE

(75) Inventor: Joakim Haegerstam, Vrigstad (SE)

(73) Assignee: Volvo Construction Equipment AB, Eskilstuna (SE)

( * ) Notice: Subject to any disclaimer, the term of this patent is extended or adjusted under 35 U.S.C. 154(b) by 836 days.

(21) Appl. No.: 14/395,534

(22) PCT Filed: Jun. 7, 2012

(86) PCT No.: PCT/SE2012/000089
§ 371 (c)(1),
(2), (4) Date: Oct. 20, 2014

(87) PCT Pub. No.: WO2013/184045
PCT Pub. Date: Dec. 12, 2013

(65) Prior Publication Data
US 2015/0107539 A1    Apr. 23, 2015

(51) Int. Cl.
*F01P 7/04* (2006.01)
*F02B 29/04* (2006.01)
(Continued)

(52) U.S. Cl.
CPC .................... *F01P 7/04* (2013.01);
*F01P 5/06* (2013.01); *F01P 7/048* (2013.01);
*F01P 7/12* (2013.01);
(Continued)

(58) Field of Classification Search
CPC .......... F01P 2060/02; F01P 11/10; F01P 1/06; F01P 2001/005; F05D 2220/40; B60K 11/08; B60K 13/02; F02B 29/04
(Continued)

(56) References Cited

U.S. PATENT DOCUMENTS 4,476,820 A    10/1984    Nixon
5,284,025 A *   2/1994    Kajitani ............. B60H 1/00392
                                                        62/160
(Continued)

FOREIGN PATENT DOCUMENTS

DE           29821616 U1    2/1999
DE        102005058441 A1    6/2006
(Continued)

OTHER PUBLICATIONS

International Search Report (dated Mar. 5, 2013) for corresponding International Application PCT/SE2012/000089.
(Continued)

*Primary Examiner* — Long T Tran
(74) *Attorney, Agent, or Firm* — WRB-IP LLP

(57) ABSTRACT

An arrangement for controlling the temperature of air being fed to a vehicle engine includes an engine compartment in which the engine is arranged. The engine compartment is provided with an ambient air intake allowing an airflow into the engine compartment. The engine is provided with an engine air intake arranged inside the engine compartment. The arrangement further includes an air fan for forcing the airflow via the ambient air intake into the inside of the engine compartment. The engine air intake is arranged in a position allowing at least a substantial part of the airflow to enter the engine air intake.

8 Claims, 4 Drawing Sheets

(51) Int. Cl.
*F02M 35/10* (2006.01)
*F02M 35/16* (2006.01)
*F01P 7/12* (2006.01)
*F01P 5/06* (2006.01)
*F01P 1/00* (2006.01)
*B60K 13/02* (2006.01)

(52) U.S. Cl.
CPC ......... *F02B 29/0431* (2013.01); *F02M 35/10* (2013.01); *F02M 35/10013* (2013.01); *F02M 35/10268* (2013.01); *F02M 35/164* (2013.01); *B60K 13/02* (2013.01); *B60Y 2200/142* (2013.01); *B60Y 2200/415* (2013.01); *F01P 2001/005* (2013.01); *F01P 2060/02* (2013.01); *Y02T 10/146* (2013.01)

(58) Field of Classification Search
USPC .......... 123/41.11, 41.12, 41.46, 41.56, 41.65
See application file for complete search history.

(56) References Cited

U.S. PATENT DOCUMENTS

| | | | |
|---|---|---|---|
| 5,899,196 A | 5/1999 | Chite | |
| 6,851,492 B2* | 2/2005 | Sato | B23B 51/0027 175/273 |
| 6,951,492 B2* | 10/2005 | Gibbs | B60F 3/0053 440/12.5 |
| 6,966,293 B1* | 11/2005 | Patillo | F02M 35/06 123/198 E |
| 7,958,854 B2* | 6/2011 | Al-Shawaf | F28D 1/0452 123/41.08 |
| 8,087,401 B2* | 1/2012 | Inoue | F02B 33/40 123/559.1 |
| 2003/0029852 A1 | 2/2003 | Ozawa et al. | |
| 2005/0211483 A1 | 9/2005 | Pfohl et al. | |
| 2007/0197157 A1 | 8/2007 | Bellinger | |
| 2008/0256950 A1* | 10/2008 | Park | F02B 37/14 60/611 |
| 2008/0257286 A1* | 10/2008 | Harich | B60K 11/085 123/41.12 |
| 2009/0173471 A1* | 7/2009 | Sakamoto | B60H 1/00278 165/41 |
| 2009/0217655 A1* | 9/2009 | Yabuki | F01P 7/044 60/456 |
| 2009/0256950 A1* | 10/2009 | Kawazoe | G03B 13/36 348/345 |
| 2011/0132292 A1* | 6/2011 | Schwartz | F01P 7/046 123/41.12 |
| 2011/0137530 A1* | 6/2011 | Kerns | F01P 7/10 701/49 |
| 2011/0248511 A1* | 10/2011 | Marlenee | H02P 9/04 290/1 A |

FOREIGN PATENT DOCUMENTS

| | | |
|---|---|---|
| DE | 102007059774 A1 | 6/2009 |
| DE | 102008039290 A1 | 2/2010 |
| FR | 2942504 A1 | 8/2010 |
| WO | 2012017521 A1 | 2/2012 |

OTHER PUBLICATIONS

International Preliminary Report on Patentabirty (dated Jul. 24, 2014) for corresponding International Application PCT/SE2012/000089.

European Search Report (dated Dec. 8, 2015) for corresponding European App. EP 12 87 8572.

* cited by examiner

ARRANGEMENT AND A METHOD FOR CONTROLLING THE TEMPERATURE OF AIR BEING FED TO A VEHICLE ENGINE

BACKGROUND AND SUMMARY

The present invention relates to an arrangement for controlling the temperature of air being fed to a vehicle engine, the arrangement comprising an engine compartment in which said engine is arranged, said engine compartment being provided with an ambient air intake allowing an airflow into said engine compartment, said engine being provided with an engine air intake arranged inside the engine compartment, and an air fan for forcing the airflow via the ambient air intake into the inside of the engine compartment.

The invention also relates to a method for controlling the temperature of air being fed to a vehicle engine arranged in an engine compartment, said engine being provided with an engine air intake arranged inside the engine compartment, said method composing controlling an air fan for forcing an airflow of ambient air into the engine compartment.

The invention is applicable on working machines within the field of industrial construction machines, in particular load receivers such as articulated haulers or dumpers. Although the invention will be described hereinafter with respect to an articulated hauler, the invention is not restricted to this particular machine, but may also be used in other heavy working machines or construction equipment. Generally, the invention could be used in virtually any type of vehicle with a combustion engine.

In connection with transportation of heavy loads, a working machine in the form of an articulated hauler is frequently used. Such a working machine may be operated with large and heavy loads in areas where there are no roads, for example for transports in connection with road or tunnel building, sand pits, mines, forestry and similar environments. Thus, an articulated hauler is frequently used in rough terrain and on a slippery ground where no regular roads are present.

An articulated hauler is a frame-steered working machine having a container for receiving and transporting a load. Such a working machine comprises a front section with a front frame and a first set of wheels, and a rear section with a rear frame and a second set of wheels. A pivot joint is arranged between the front section and the rear section allowing the front section and the rear section to pivot relative to each other about an axis extending in the vertical direction. Furthermore, the working machine comprises means for steering the working machine by pivoting the front section and the rear section relative to each other about the vertical pivot axis. The steering means normally includes a pair of hydraulic cylinders.

The front section is a tractor for driving the working machine and the rear section is provided with the container for receiving the load. In order to optimize the load capacity, the front section is normally shorter than the rear section. Usually the front section has one wheel axle, whereas the rear section has two wheel axles mounted as bogie axles.

The above-mentioned types of working machines are normally operated by means of combustion engines. For this reason, there is a demand for arrangements which provide an inflow of air to the engine in order for the combustion process in the engine to take place in a correct manner.

It is also known that a combustion engine can be equipped with a turbocharger device which, according to known technology, comprises a turbine which is driven by the exhaust gases produced by the engine. The turbine is connected to a compressor, by means of which a flow of air to the engine is compressed before being fed to the engine. In this manner, an increased amount of input air can be compressed and fed to the engine, thereby increasing the power of the engine.

When operating a combustion engine with a turbocharger device, for example in a working machine as described above, it is consequently important to feed an inflow of air from the surrounding atmosphere to the engine. Obviously, combustion engines which are not equipped with a turbocharger device also need a sufficient inflow of air.

Furthermore, there is a need to control the temperature of the airflow being fed to the engine. More precisely, the temperature of the air to the engine should be adapted to the operating conditions of the combustion engine and the vehicle in question. For example, in order to fulfil requirements regarding low emissions of harmful exhaust gases, there is a requirement for a relatively high temperature of the exhaust gases. This corresponds to a need for a relatively high temperature of the inflow of air to the engine in certain operating modes of the engine. This corresponds for example to a situation in which the engine has just been started and is idling.

On the other hand, when the engine is operated so as to provide a relatively high output torque, for example when using a turbocharger device, there is a need to decrease the temperature of the input air the engine. For this reason, a turbocharger device is often provided with a charge air cooler which is arranged to decrease the temperature of the input air guided through it.

According to known technology, an increased temperature of the air to the engine can obtained through operating the engine in certain heating modes in which fuel is added in order to raise the exhaust gas temperature. Even though the aim of raising the exhaust gas temperature is obtained in is manner, the method leads to a disadvantage since it increases the fuel consumption of the engine.

The patent document US 2007/0197157 teaches a system for managing engine intake air temperature, especially under colder ambient conditions and for systems comprising exhaust gas after treatment devices. The system uses two conduits, one that receives intake air from outside the vehicle, and one that receives intake air from the engine compartment. A flow control device is used to control from which source the intake air is taken and the flow control device is controlled based on the engine operating temperature.

Although the system according to US 2007/0197157 is directed to the purpose of controlling the temperature of the intake air temperature, there is still a demand for more improved arrangements and methods, in particular for adapting the temperature control of the inflow of air to specific operational conditions of an engine so that for example demands for low emissions of harmful exhaust gases can be reached.

It is desirable to solve the above-mentioned problem and to provide an improved arrangement and method for controlling the temperature of the input air being fed to an engine, in particular so that the air temperature is adapted in a correct manner to the operating conditions of the engine and the vehicle in a manner which is efficient as regards cost, fuel consumption and reduction of exhaust emissions.

It is also desirable to provide a simple and cost-effective solution for controlling the temperature of the input air.

According to an aspect of the present invention, an arrangement of the kind as mentioned initially which is characterized in that the engine air intake is arranged in a position allowing at least a substantial part of said airflow to enter the engine air intake.

In this context, the term "substantial part" refers to the fact that, according to the invention, a relatively high amount of the airflow which enters the ambient air intake can also be guided further so as to reach the engine air intake. This is particularly useful during operational conditions in which the engine needs an inflow of relatively cold air.

An advantage with the invention is that it reduces fuel consumption of the engine since the engine does not need to be operated in any particular heating mode (in which fuel is added) in order to raise the exhaust temperature.

A further advantage of the invention is that it constitutes an energy-efficient solution for controlling air temperature due since it uses waste heat from the engine to increase the temperature of air which is fed into the engine.

According to an embodiment, the invention constitutes a "self-regulating" solution which provides a boost effect in the sense that when the engine needs colder air, the speed of the air fan is increased (which leads to a higher degree of cooling in the charge air cooler), which at the same increases the inflow into the engine compartment and a larger part of the input air to the engine will be constituted by colder air.

A further advantage of the invention is that the service interval of the engine's air filter can be extended since the engine air intake can be located inside the engine compartment, which is a relatively clean place on a working machine such as an articulated hauler.

According to an embodiment of the invention a control unit is arranged to control the air fan for providing said airflow to the engine air intake. Suitably, the air fan is arranged for selectively being operated in a first mode of operation with a relatively high speed for providing an airflow from said ambient air intake to said engine air intake, thereby decreasing the temperature of the air flowing into said engine air intake; or a second mode of operation with a relatively low speed for providing an airflow from within the engine compartment to said engine air intake, thereby increasing the temperature of the air flowing into said engine air intake. In this manner, an efficient control of the air temperature can be obtained which is adapted to various operational conditions of the engine.

According to an embodiment, the speed of the air fan is controlled depending on the operational condition of said engine. This means that the speed of the air fan can be chosen in order to provide a suitable amount of intake air for each given type of operation of the engine.

Furthermore, when the engine needs warmer air, the speed of the charge air cooler's fan can be decreased, which at the same time reduces the inflow of air into the engine compartment, and a higher proportion of the intake air to the engine will be constituted by air which has been heated by the engine.

The method according to the invention can be performed through execution of a computer program, which comprises program code means for performing all the steps according to the method according to the invention when the program is run on a computer. In particular, an aspect of the invention comprises a computer system for implementing a method for controlling the temperature of air being fed to a vehicle engine arranged in an engine compartment, said engine being provided with in engine air intake arranged inside the engine compartment, said method comprising controlling an air fan for forcing an airflow of ambient air into the engine compartment, the computer system comprising a processor operable to providing said airflow in a way enabling at least a substantial part of the airflow to enter the engine air intake.

BRIEF DESCRIPTION OF DRAWINGS

The invention will be described below with reference to an embodiment and the appended drawings, in which.

DETAILED DESCRIPTION

Figure 1:
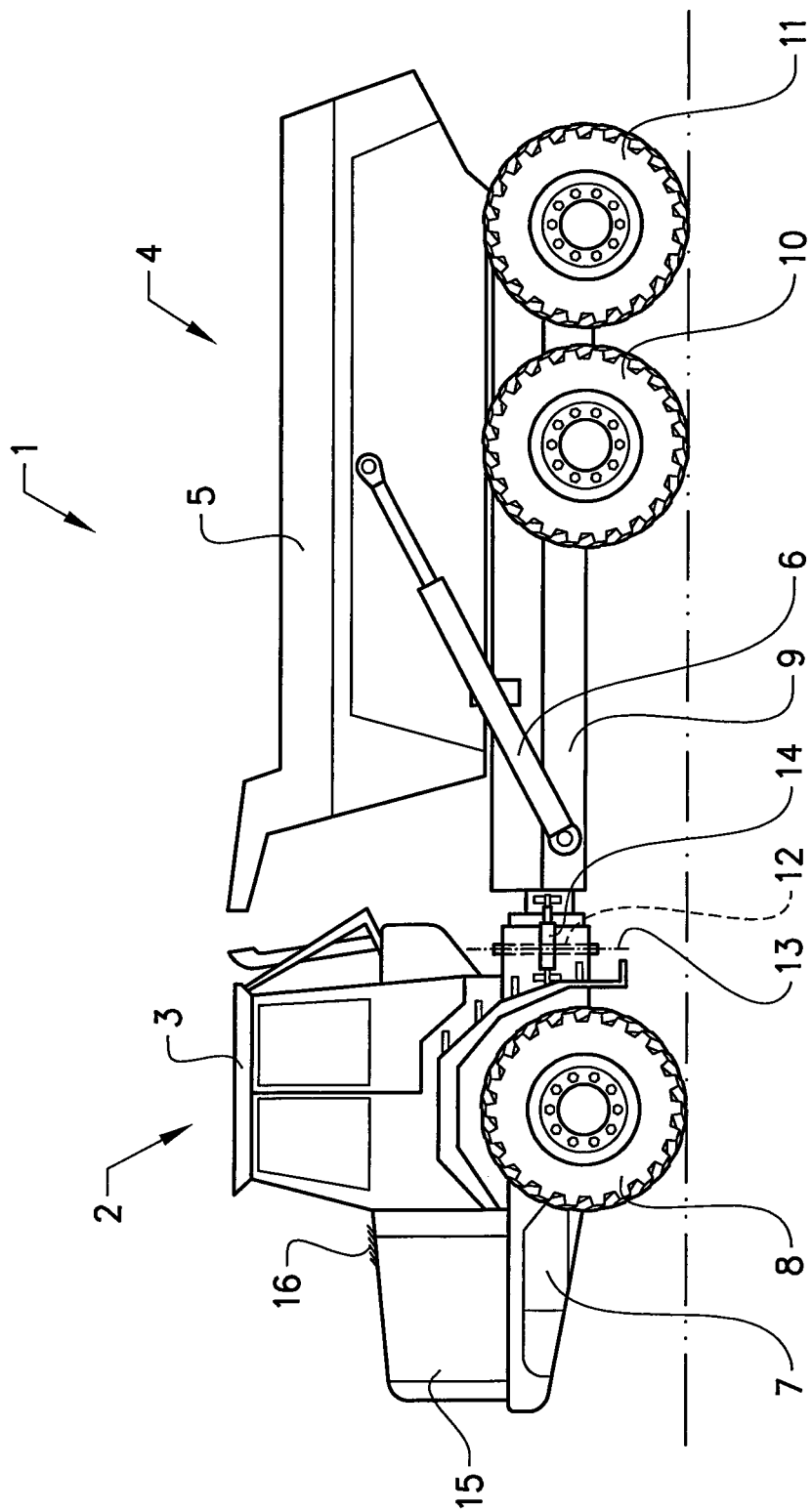
FIG. 1 is a schematic side view of a working machine in the form of an articulated hauler in which the present invention can be used.

FIG. 1 is an illustration of a working machine 1 in the form of an articulated hauler having a front section 2 with a cab 3 for a driver and a rear section 4 with a container 5 for receiving a load. The container 5 is preferably pivotally connected to the rear section and tiltable by means of a pair of tilting cylinders 6, for example hydraulic cylinders. The front section has a front frame 7 and a pair of wheels 8 suspended from the front frame 7. The rear section 4 has a rear frame 9 and two pairs of wheels 10, 11 suspended from the rear frame 9.

The working machine is frame-steered, i.e. there is a pivot point 12 connecting the front section 2 and the rear section 4 of the working machine 1. The front section 2 and the rear section 4 are pivotally connected to each other for pivoting about a substantially vertical pivot axis 13.

The working machine 1 preferably comprises a hydraulic system having two hydraulic cylinders 14, steering cylinders, arranged on opposite sides of the working machine for turning the working machine by means of relative movement of the front section 2 and the rear section 4. The hydraulic cylinders 14 can, however, be replaced by any other linear actuator for steering the machine, such as an electromechanical linear actuator.

The working machine 1 can further comprise a second pivot joint connecting the front section and the rear section of the working machine, for allowing the front section and the rear section to pivot relative to each other about a substantially horizontal pivot axis extending in the longitudinal direction of the working machine.

The working machine 1 is operated by means of a combustion engine which is not visible in FIG. 1 but which is located, in a generally conventional manner, inside an engine compartment 15. The engine compartment 15 is provided with an ambient air intake 16 allowing ambient air to flow into the engine compartment 15. In this context, the term "ambient air" refers to air being in the atmosphere outside the engine compartment 15 which can be guided into the engine compartment 15 via said ambient air intake 16.

As mentioned initially, in a vehicle with a combustion engine, there is generally a need for systems which are arranged for providing a suitable flow of air into the engine and having a controlled temperature which is adapted to the operation of the engine and the vehicle. This means that during certain operating conditions there may be a demand for inputting relatively hot air to the engine, whereas during certain other operating conditions there may be a demand for inputting relatively cold air to the engine. This is particularly the case in the event that the engine is equipped with a turbocharger arrangement.

As previously known, a turbocharger comprises a turbine which operates a compressor by means of which a flow of input air is compressed before being fed to the engine. The input air which is compressed by the compressor becomes heated due to the compression and for this reason, a turbocharger device is often provided with a charge air cooler which is arranged to cool down the input air guided through it. As will be described below, the invention can advantageously be used in connection with an engine being equipped with a turbocharger and a charge air cooler.

Figure 2:
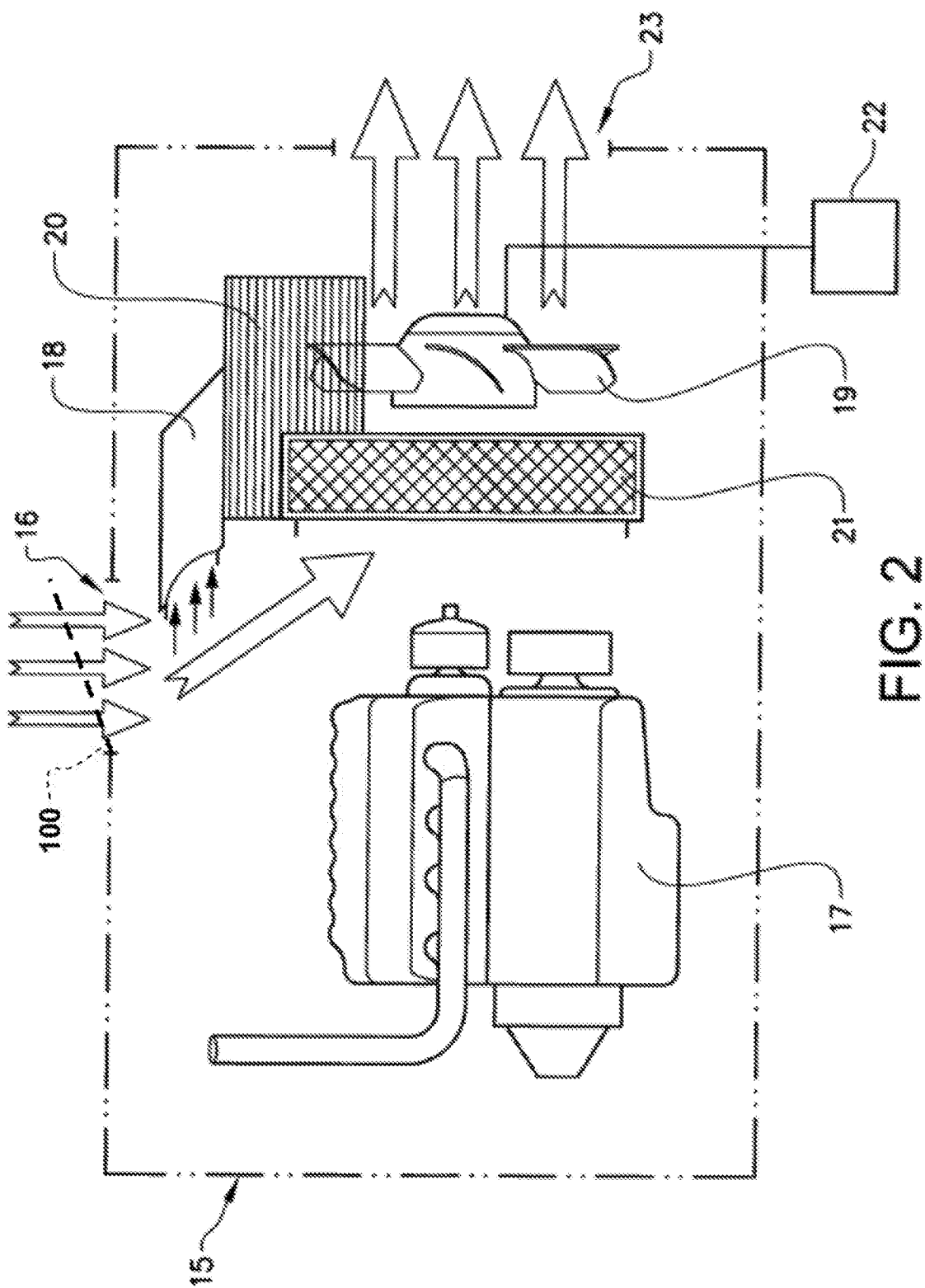
FIG. 2 illustrates in a schematic manner an engine compartment in which the present invention is arranged.

FIG. 2 is a schematic view of an engine compartment 15 arranged in accordance with the principles of the invention. FIG. 2 is merely a schematic illustration and does not indicate the precise design and placement of the various components forming part of the invention. The engine compartment 15 is arranged so as to accommodate a combustion engine 17 and various other engine parts. FIG. 2 does not show a complete engine arrangement, i.e. only those parts which are essential for the understanding of the invention are shown in FIG. 2.

As mentioned above, the engine compartment 15 is provided with the ambient air intake 16 (see also FIG. 1) in order to allow air from outside the engine compartment 15 to be guided into said engine compartment 15. Furthermore, the combustion engine 17 is provided with an engine air intake 18 arranged inside the engine compartment 15. The engine compartment 15 also accommodates an air fan 19 for forcing an airflow through the ambient air intake 16 and into the engine compartment 15.

In a manner which is previously known as such, the air fan 19 according to this embodiment is suitably used for forcing air through a charge air cooler 21 to cool the air. The charge air cooler 21 is part of a turbocharger device (not shown in detail in the drawings) and, as mentioned above, the purpose of the charge air cooler 21 is to reduce the temperature of air being forced to the engine air intake 18 by means of a compressor (not shown) forming part of the turbocharger device. The operation of a conventional turbocharger device with a turbine and compressor is known to the skilled person, and for this reason it is not described in detail here.

It is an important feature of the present invention that the engine air intake 18 is arranged in a position allowing at least a substantial part of the flow of air which passes through the ambient air intake 16 so that it may enter the engine air intake 18. This means that the actual position of the engine air intake 18 is chosen in a manner so that the flow of ambient air which enters the ambient air intake 16 has a direction and velocity which allows a significant fraction of the ambient air flow to enter the engine air intake 18. The actual positioning of engine air intake 16 may vary, but is chosen in relation to the position of the ambient air intake 16 so that, as mentioned above, a substantial part of the inflow of air can be used as input air to the engine.

The airflow which passes through the ambient air intake 16 and through the engine air intake 18 and further to the engine 17 is, according to the embodiment shown, also guided via an air cleaner 20 and then to said charge air cooler 21. The air fan 19 is as mentioned above suitably associated with the charge air cooler 21.

The air fan 19 according to the embodiment is generally arranged to be operated in two different modes of operation. Firstly, the air fan 19 has a first mode of operation, with a relatively high speed, for providing a relatively high airflow from the ambient air intake 16 to the engine air intake 18.

The result of this is that a high amount of air from the atmosphere is forced in through the ambient air intake 6 and further to the engine air intake 18. In this manner the temperature of the air flowing into the engine air intake 18 will be decreased. This is particularly the case during cold climate, when the air outside the engine compartment 15 often is relatively cold.

This first mode of operation corresponds for example to a driving situation during which there is a demand for a high torque from the engine, which for example means that a compressor in a turbo arrangement causes heating of incoming air. In such a situation, it is advantageous to provide an inflow of relatively cold air, i.e. which is provided by means of the invention.

Alternatively, the air fan 19 can be operated in a second mode of operation with a relatively low speed, for providing an airflow from within the engine compartment 15 and further to the engine air intake 18. Consequently, in this second mode of operation, a low amount of air (or no air at all) from the atmosphere outside of the engine compartment 15 is fed into the engine compartment 15. Instead, the air already being inside the engine compartment 15—which is already relatively warm since it has been heated by the engine 17—will be forced into the engine air intake 18. In this manner, the temperature of the air flowing into said engine air intake 18 will be increased.

The second mode of operation corresponds for example to a driving situation during which there is a requirement to reduce emissions of harmful pollutants in the exhaust gas from the engine 17. In such a situation, it is advantageous to provide an inflow of relatively warm air, i.e. as provided by means of the invention. A particular advantage with the provision of relatively warm air according to the invention is that it uses waste heat resulting from the operation of the engine 17.

According to the embodiment, the air fan 9 is suitably connected to a fan control unit 22, which is shown in a schematical manner in FIG. 2. The fan control unit 22 can be implemented as a unit which is integrated with a another control unit such as an existing engine control unit (not shown in the drawings) or can be implemented as a separate unit.

Furthermore, the fan control unit 22 is preferably arranged for controlling the speed of the air fan 19 depending on the operational condition of said engine. This means that the speed of the air fan 19, as mentioned above, can be chosen so as to obtain an optimal inflow of ambient air into the engine air intake depending on the engine's operation condition.

It should also be noted that the input air, which is guided through the ambient air intake 16, passes the engine air intake 18, where some of the input air actually enters into said engine air intake 18. The remaining flow of air is eventually guided out from the engine compartment 15, as indicated schematically with reference numeral 23 in FIG. 2.

Figure 3:
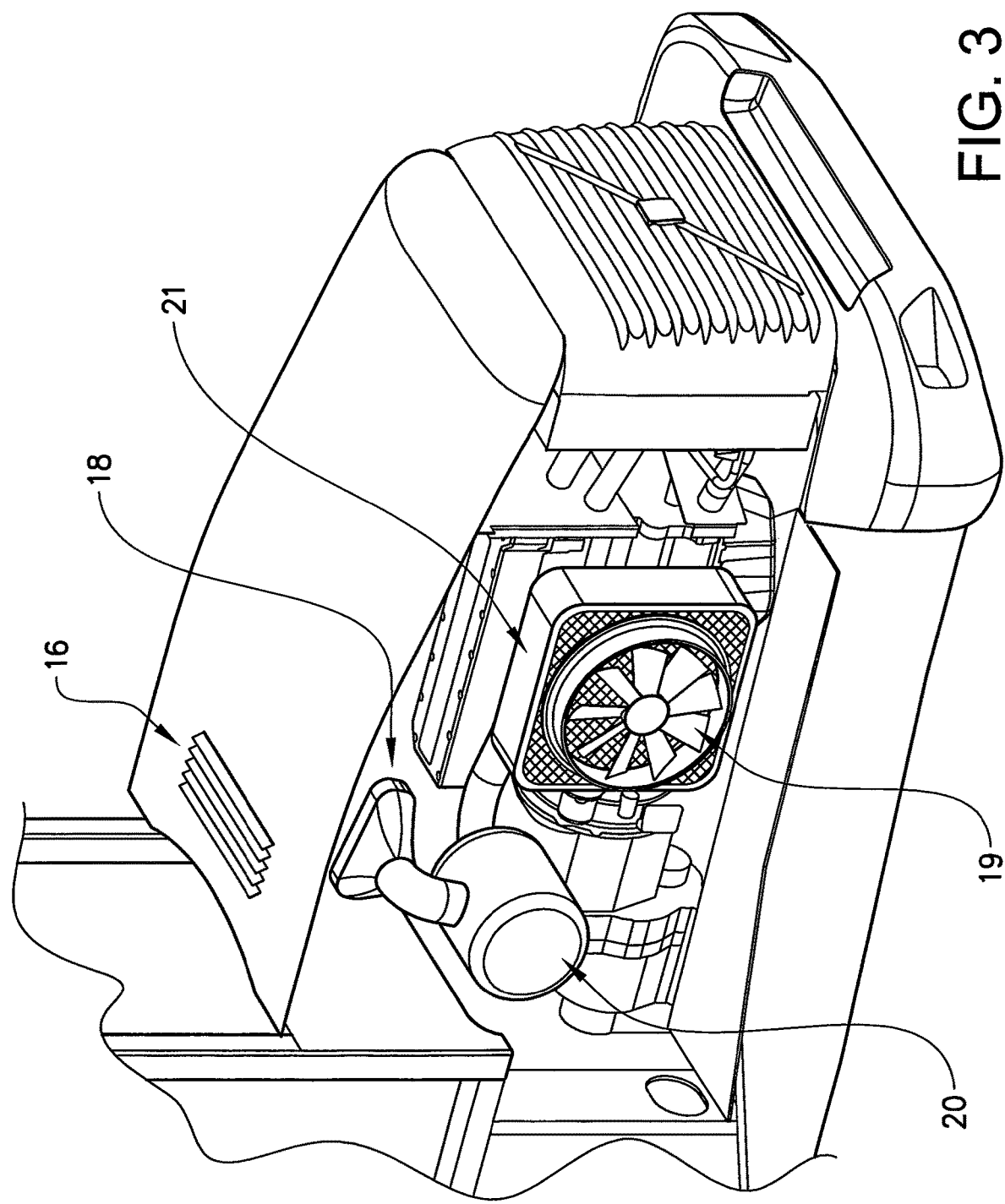
FIG. 3 is a perspective view of an arrangement according to an embodiment of the invention.
Figure 4:
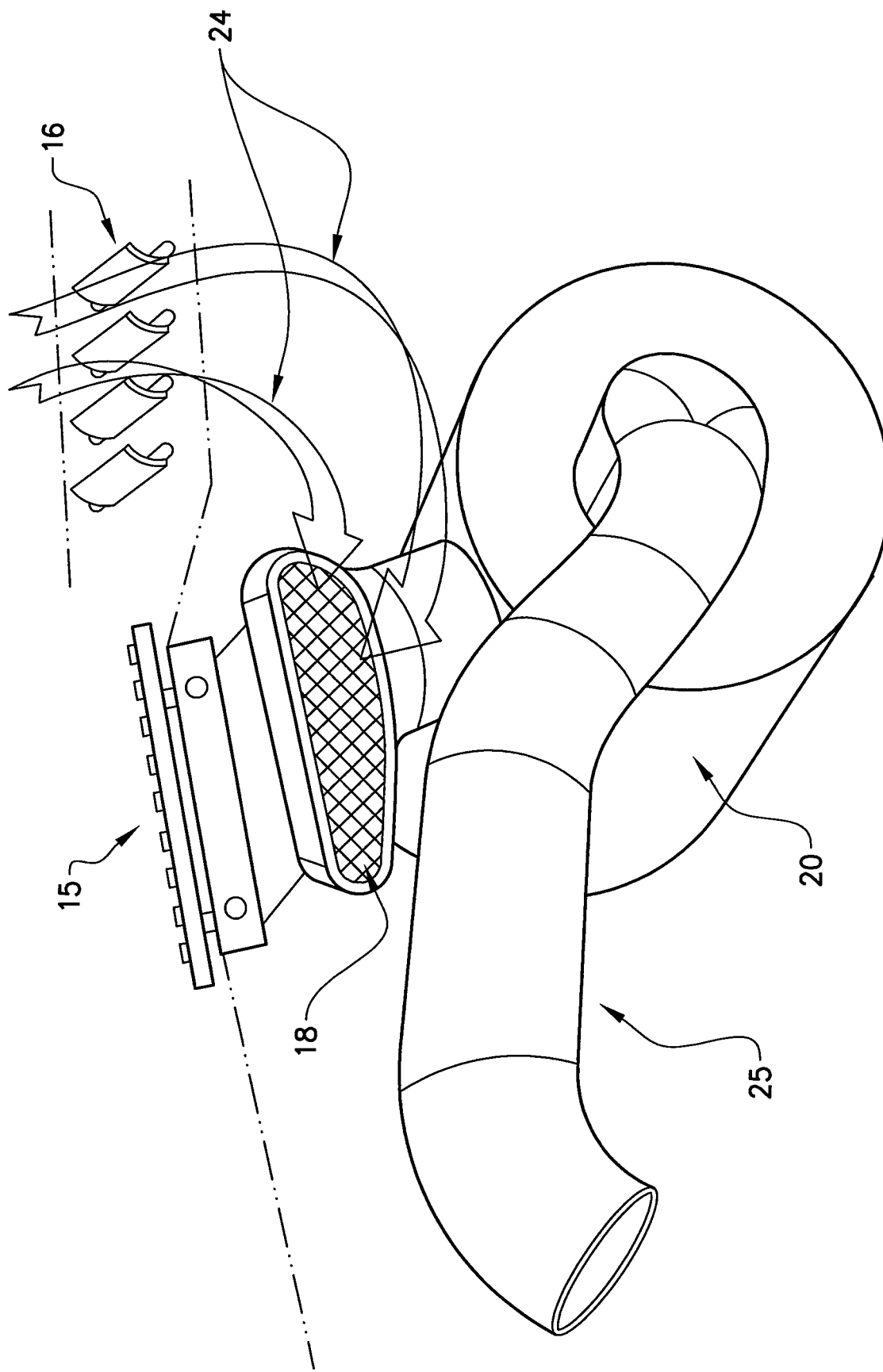
FIG. 4 is a further perspective of the embodiment shown in FIG. 3.

FIGS. 3 and 4 show in greater detail an arrangement according to an embodiment of the invention. FIG. 3 is a perspective view from above of the engine compartment 15 and FIG. 4 is a side view of a portion of the upper part of the engine compartment 15. It can be noted that the ambient air intake 16 is suitably located on the upper side of the engine compartment 15. The ambient air intake 16 could be designed as a ventilated opening in order for air to be guided into the interior of the engine compartment. This is indicated in a schematical way by means of an arrow 24 in FIG. 4.

Furthermore, a substantial part of the inflow of air through the ambient air intake 16 will reach the opening of the engine air intake 18. The engine air intake 18 is for this reason suitably positioned in close vicinity of said ambient air intake 16, in a position which corresponds to the direction of flow of the airflow which is guided into the engine compartment 15.

In order to obtain a substantial flow of air into the engine air intake 18, the engine air intake 18 is furthermore suitably positioned between said ambient air intake 16 and said air fan 19, as regarded along the direction of flow of the airflow which is guided into the engine compartment 15.

The air which enters the engine air intake 18 is furthermore guided through an air cleaner 20 and further to a turbo compressor (not shown in the drawings) via an air duct 25 (see also FIG. 4).

As shown in particular in FIG. 3, the arrangement comprises an air fan 19 for forcing the airflow via the ambient air intake 16 into the engine compartment 15. According to the illustrated embodiment, the air is forced by means of the air fan 19 to pass through the charge air cooler 21 before it is guided out of the engine compartment 15 (see also FIG. 2).

According to the embodiment shown, the engine air intake 18 is preferably positioned in close vicinity to a part of the vehicle engine 17 which reaches a relatively high temperature during operation, most preferably in close vicinity to the warmest position of the engine 17. In this manner, the waste heat from the engine can be used in an efficient manner, in particular when there is a need for air of relatively high temperature to the engine 17.

According to a possible further embodiment, which is not shown in the drawings, the engine compartment 15 could be provided with a controllable shut-off door 100 (shown schematically in phantom in FIG. 2) for selectively preventing ambient air from entering said ambient air intake 16. This can be used in the above-mentioned second mode of operation, i.e. when the air fan 19 is operated at a relatively low speed and where there is a demand to introduce a low amount of air into the engine compartment 15, or possibly no input of air at all.

It should be noted that the incoming air which is brought into the engine compartment by means of the fan has a relatively low temperature. On the other hand, when there is no inflow of air to the engine compartment, the intake air to the engine air intake will be constituted by air which has been heated by the engine. That air has a relatively high temperature. Consequently, the invention constitutes an advantage in that it is an energy-efficient solution since it uses waste heat from the engine to increase the temperature of air which is fed into the engine. According to one embodiment, this advantage can be further emphasized by positioning the engine air intake close to the warmest parts of the engine.

It should be noted that the invention can be implemented by means of a computer system by means of which the above-mentioned steps can be carried out. The method according to the invention can be performed by means of a computer program comprising suitable program code means for performing said method steps when the program is run on a computer.

The invention is not limited to the embodiments described above, but can be varied within the scope of the subsequent claims. For example, the invention is not limited for use in connection with a working machine such as the articulated hauler shown in FIG. 1, but can be implemented in other types of vehicles too. Also, the invention can be used in connection with engines being equipped with a turbocharger device but can also be used in engine arrangements without turbocharger devices.

The invention claimed is:

1. An arrangement for controlling the temperature of air being fed to a vehicle engine, the arrangement comprising an engine compartment in which the engine is arranged, the engine compartment being provided with an ambient air intake allowing an airflow into the engine compartment, the engine being provided with an engine air intake arranged inside the engine compartment, and an air fan for forcing the airflow via the ambient air intake into the inside of the engine compartment, the engine air intake being arranged in a position allowing at least a substantial part of the airflow to enter the engine air intake wherein the air fan is arranged for selectively being operated in:
   a first mode of operation with a relatively high speed for providing an airflow from the ambient air intake to the engine air intake, thereby decreasing the temperature of the air flowing into the engine air intake; or
   a second mode of operation with a relatively low speed for providing an airflow from within the engine compartment to the engine air intake, thereby increasing the temperature of the air flowing into the engine air intake.

2. An arrangement according to claim 1, wherein the arrangement comprises a control unit arranged to control the air fan for providing the airflow to the engine air intake.

3. An arrangement according to claim 2, wherein the control unit is arranged for controlling of the speed of the air fan depending on the operational condition of the engine.

4. An arrangement according to claim 1, the arrangement comprising a turbo device having a charge air cooler, wherein the air fan is arranged for forcing air through the charge air cooler.

5. An arrangement according to claim 1, wherein it comprises a shut-off door for selectively preventing ambient air from entering the ambient air intake.

6. An arrangement according to claim 1, wherein the engine air intake is positioned between the ambient air intake and the air fan, along the direction of flow of the airflow into the engine compartment.

7. An arrangement according to claim 1, wherein the engine air intake is positioned in close vicinity to a part of the vehicle engine which reaches a relatively high temperature during operation.

8. A vehicle comprising an arrangement according to claim 1.

* * * * *